March 16, 1954

R. M. NICHOLS ET AL 2,672,180

FILM SPLICING DEVICE

Filed Jan. 29, 1951

INVENTORS
RALPH M. NICHOLS AND
CHARLES D. COWAN

BY Parrott, Richards & Sims
ATTORNEYS

March 16, 1954 — R. M. NICHOLS ET AL — 2,672,180
FILM SPLICING DEVICE
Filed Jan. 29, 1951 — 4 Sheets-Sheet 2

INVENTORS
RALPH M. NICHOLS AND
BY CHARLES D. COWAN

Parrott, Richards & Sims
ATTORNEYS

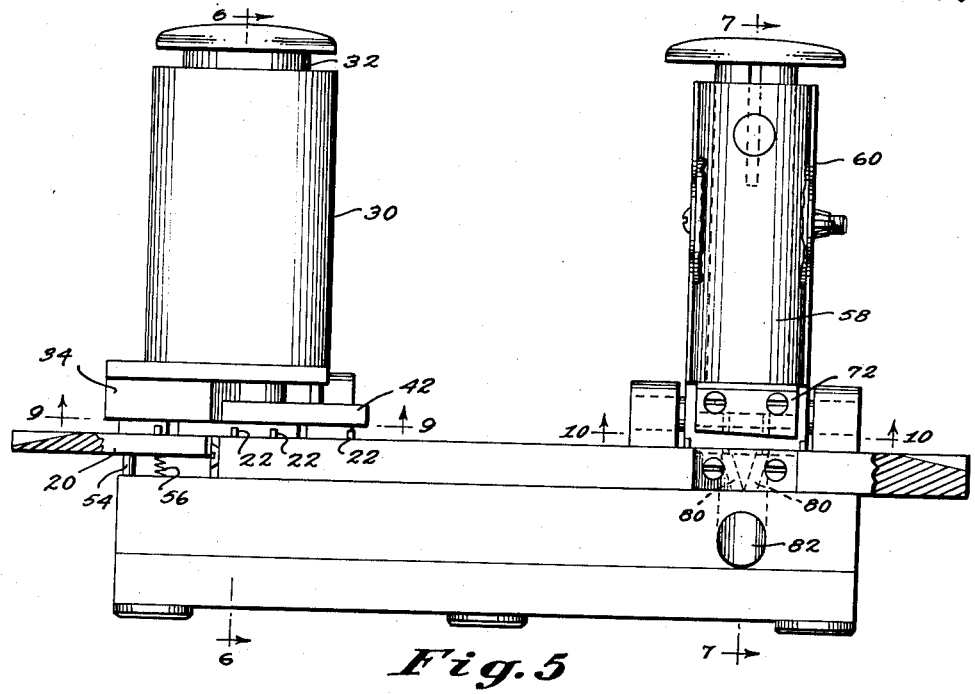
Fig. 5
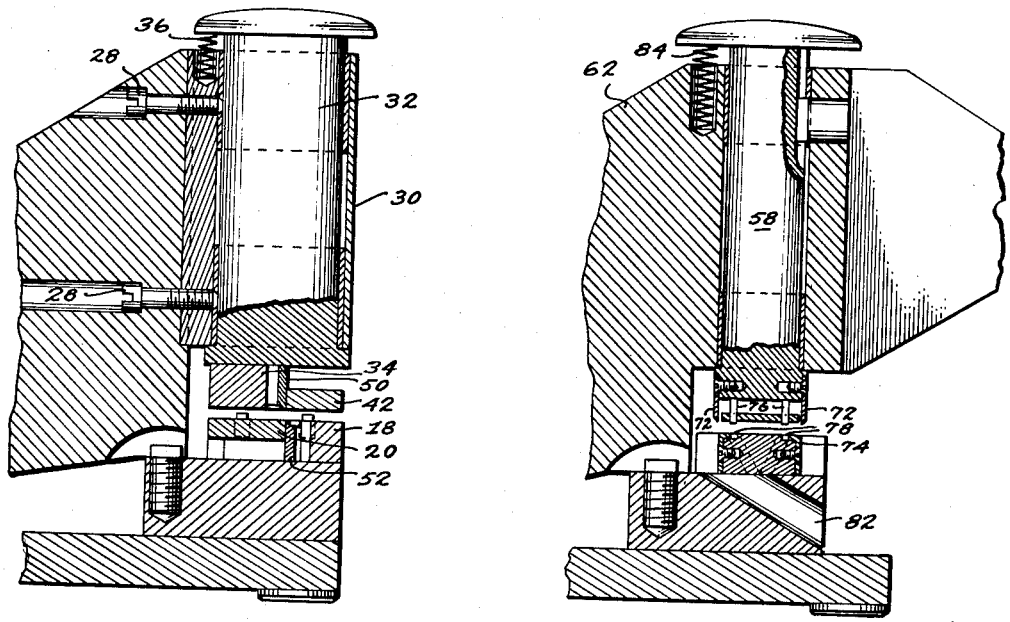
Fig. 6
Fig. 7
INVENTORS
RALPH M. NICHOLS AND
BY CHARLES D. COWAN
Parrott, Richards & Sims
ATTORNEYS March 16, 1954
R. M. NICHOLS ET AL
2,672,180
FILM SPLICING DEVICE
Filed Jan. 29, 1951
4 Sheets-Sheet 4
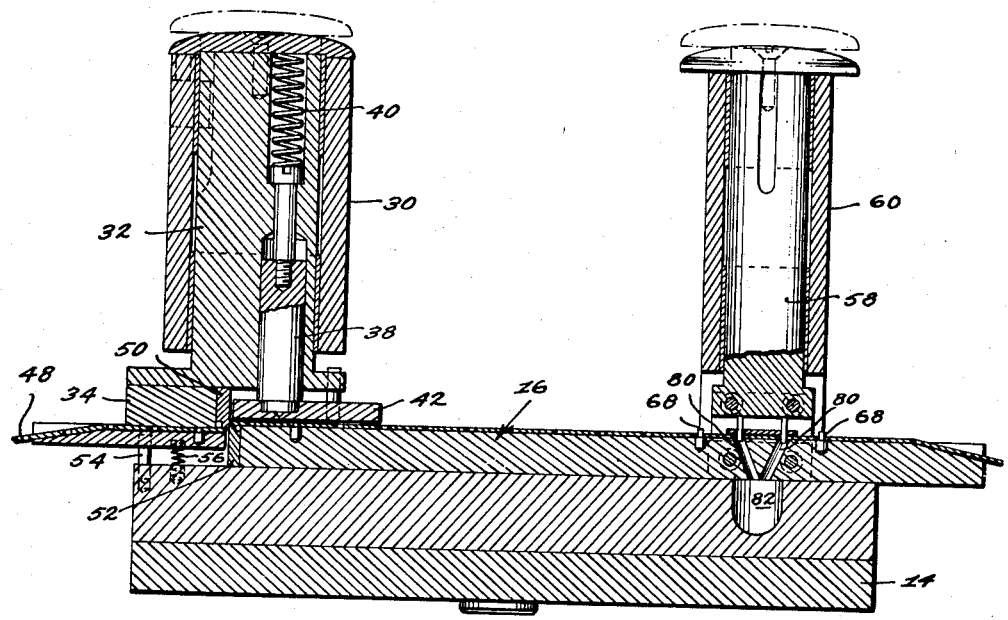
Fig.8
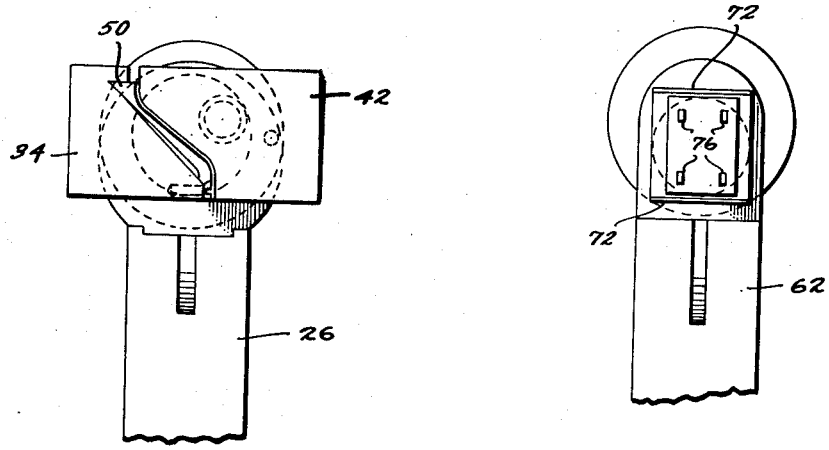
Fig.9
Fig.10
INVENTORS
RALPH M. NICHOLS AND
BY CHARLES D. COWAN
Parrott, Richards & Sims
ATTORNEYS Patented Mar. 16, 1954

2,672,180

UNITED STATES PATENT OFFICE 2,672,180

FILM SPLICING DEVICE

Ralph M. Nichols and Charles D. Cowan, Greenville, S. C., assignors to Bob Jones University, a corporation of Tennessee Application January 29, 1951, Serial No. 208,294

4 Claims. (Cl. 154—42.1)

This invention relates to a film splicer and particularly to one adapted for splicing magnetic sound film.

In making motion pictures, the sound is initially recorded on a strip of magnetic tape for subsequent synchronization with the visual portion of the film. In editing the film, it is necessary to delete portions and to insert other portions. This necessitates cutting and splicing the sound film at numerous points. With magnetic film, the commonly used overlapping splice or a square-cut abutting splice will cause a break in the magnetized portion of the film and produce an undesirable noise when it passes across the pickup device. Since the sound carrying portion of the film is several millimeters in widtth, a diagonal splice with abutting edges will pass over the pickup device without producing a break in the connection and will go unnoticed. However, no one has yet devised a satisfactory film splicing device for making a diagonal cut across a film and good hand-made splices are extremely difficult to make.

In addition to the undesirable noise produced at the point of splice, a conventional film splicer is constructed of magnetic metal and produces an undesirable transfer of sound from one point on the film to another. This is due to magnetization of the metal at the point of contact with the magnetic film. When another portion of film is brought into contact with the magnetized metal, there is a transfer of the sound from the metal to the film at the point of contact.

In accordance with the present invention, there is now provided a device for use in splicing magnetic film with means for making a uniform diagonal cut across the ends of the film to be joined, whereby a perfect abutting fit is made possible. In addition, the present invention provides support and cutting and taping members of non-magnetic material, so that the only magnetic parts that touch the film are two very small shear blades, having such a small area of contact with the film that transfer of sound thereby is extremely unlikely. The present invention also provides a means for attaching adhesive tape directly to the abutting edges of the film being spliced and means for trimming the edges and forming register holes in the tape without producing any contact with magnetic metal. The present invention will be explained hereafter in greater detail in connection with the accompanying drawings, in which:

Fig. 5 is a front elevation of the device shown in Fig. 1;

Fig. 6 is a sectional view taken generally along the line 6—6 of Fig. 5 and showing the film shearing device in section;

Fig. 7 is a sectional view taken generally along the line 7—7 of Fig. 5 and showing the trimming and punching device in section;

Fig. 8 is a sectional view taken generally along the line 8—8 of Fig. 3;

Fig. 9 is a plan view of the film shearing mechanism taken generally along the line 9—9 of Fig. 5; and Fig. 10 is a plan view of the trimming and punching device taken generally along the line 10—10 of Fig. 5.

Figure 1:
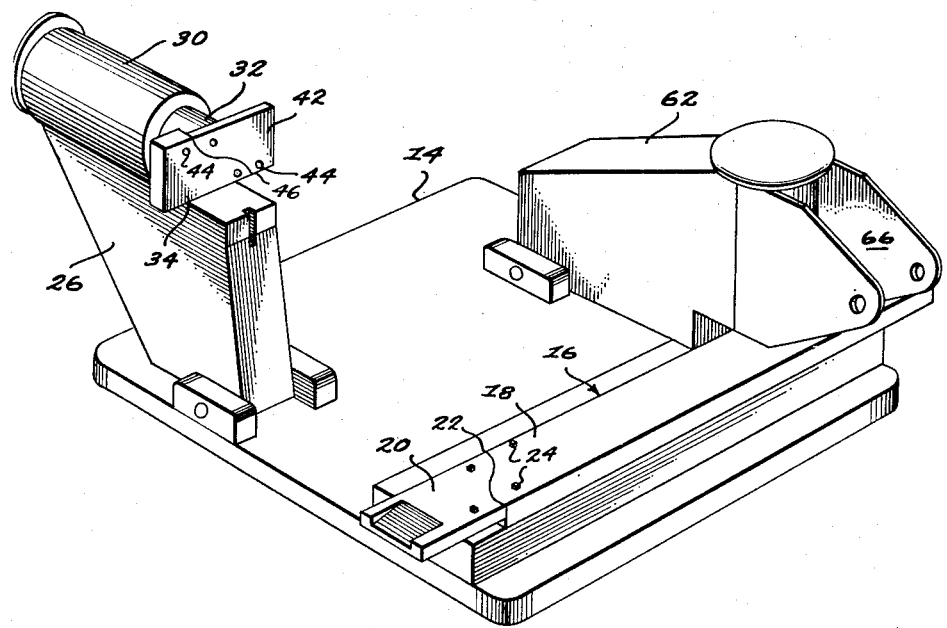
Fig. 1 is a perspective view of the film splicing device.

Referring now to the drawings and in particular at first to Fig. 1, the device of the present invention includes a base 14 and a film support of non-magnetic metal, shown generally at 16. This film support includes a fixed portion 18 and a depressable portion 20, the inner adjacent edges of which have a generally diagonal configuration, as shown at 22. Register pins 24 are provided on support 16 for positioning the film thereon, as will be discussed in greater detail later.

Pivotally mounted on base 14, adjacent film support 16 is a first lever 26 to the free end of which is attached by convenient means, such as screws 28 (see Fig. 6), a head member 30, which carries for reciprocation therein a piston 32, at the lower end of which is a blade carrying member 34 adapted to engage depressable member 20 when a strip of film is being severed. Head member 32 is yieldingly urged upwardly within head member 30 by means of spring 36. Slidably disposed in an appropriate eccentric recess within piston 32 is a second piston 38 which is yieldingly urged downwardly by means of spring 40. Piston 38 supports at its lower end a film holding member 42, the face of which lies in the same plane as that of blade carrying member 34. Appropriate recesses 44 are formed in the faces of film holding member 42 and blade carrying member 34 for receiving register pins 24 and the members 34 and 42 have abutting edges shaped to produce a joint having a diagonal configuration, as shown at 46.

As shown in Fig. 8, when head member 30 is swung into an operative position, it brings blade carrying member 34 and film holding member 42 into contact with the film 48 resting on film support 16. This brings shearing blade 50 on blade carrying member 34 into operative engagement with ledger blade 52, which is carried at the inner end of fixed member 18. These blades are so formed as to make a diagonal cut across the magnetic portion at the middle of film 48. Pressure on the upper end of piston 32 produces downward reciprocation of the blade carrying member 34 which displaces depressable member 20 downwardly. At the same time, film holding member 42 is displaced upwardly in relation to piston 32 by fixed member 18 of film support 16. This brings shearing blade 50 into operative engagement with ledger blade 52 and severs the film.

When head member 30 is raised, depressable member 20 is returned to its normally raised position on guide 54 by means of spring 56. With a broken strip of film, the ends to be joined can be overlapped at the blades and both ends severed at once to produce a perfect fit for the desired abutting splice.

Figure 2:
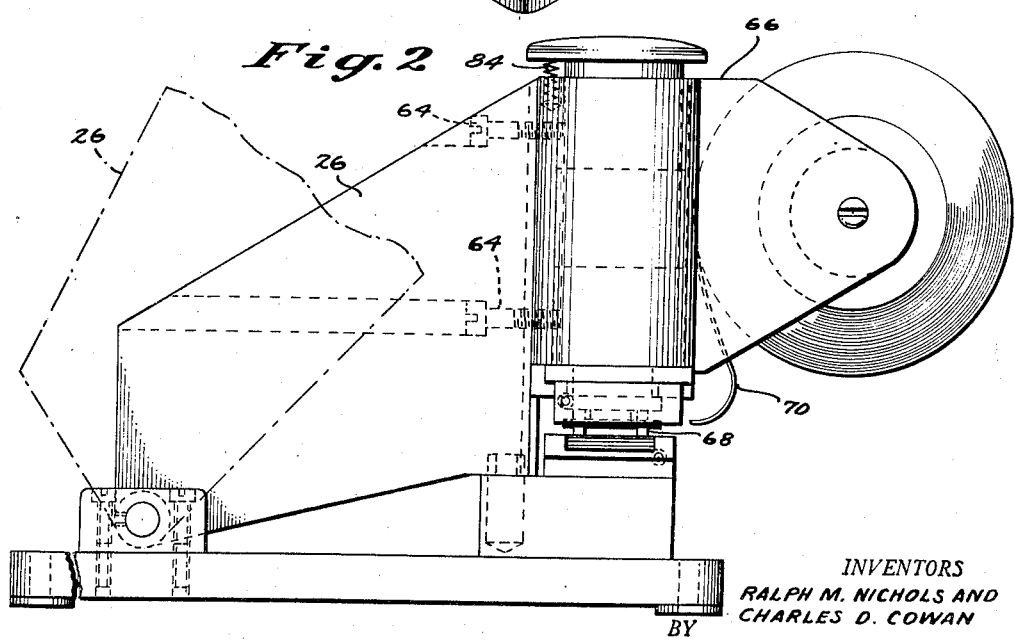
Fig. 2 is an elevation of a portion of the device, showing the tape dispensing and trimming mechanism.

The severed ends of film 48 are transferred to a position beneath die member 58 which is carried for reciprocation in die support 60, which in turn is supported at the free end of a second lever 62 pivotally mounted on base 14. Die support 60 is secured to second lever 62 by means of appropriate screws 64 (Fig. 2). To join the severed ends, an appropriate length of tape 70 is withdrawn and is laid across the abutting ends which are maintained in fixed relationship by means of register pins 68, which project upwardly from film support 16. Die member 58 is then lowered into engagement with the film 48 and downward reciprocation of die member 58 moves lateral shearing blades 72 into operative engagement with lateral ledger blades 74 to sever the tape 70 at the edge of the film and simultaneously trim the overhanging portion of tape at the edge of the film 48. At the same time, punches 76, which register with appropriate dies 78 in film support 16, perforate the tape at the registration holes. Dies 78 open into small channels 80 extending downwardly through support member 16, whereby convenient means for removing the trimmings from the tape is provided. The small channels 80 may converge into a larger channel 82, to provide a convenient means of accumulating the trimmings at a single outlet. Die member 58 is normally urged yieldingly upwardly in die support 60 by means of a spring 84.

In order to prevent undesirable transfer of sound from one portion of the film to another, which may occur when different portions of a magnetic film come in contact with a magnetized body, all parts of the present device that come in contact with the magnetized portion at the middle of the film are, where possible, of non-magnetic metal, such as aluminum, bronze, etc. However, the shearing and ledger blades 50 and 52, the lateral shearing blades 72, lateral ledger blades 74 and the punches 76, are preferably formed of high grade steel so that the cutting edges can be maintained sharp. Since the magnetized portion of the film runs longitudinally along the center portion, it is seen that the only point at which magnetic metal comes in contact with the magnetized portion of the film is at the shearing blade 50 and ledger blade 52 when a cut is made. The shearing edges are extremely thin and since the splices are made between words and sound, if at all possible, it is seen that the present device would offer very little opportunity for the transfer of sound from one portion of the film to another.

Figure 3:
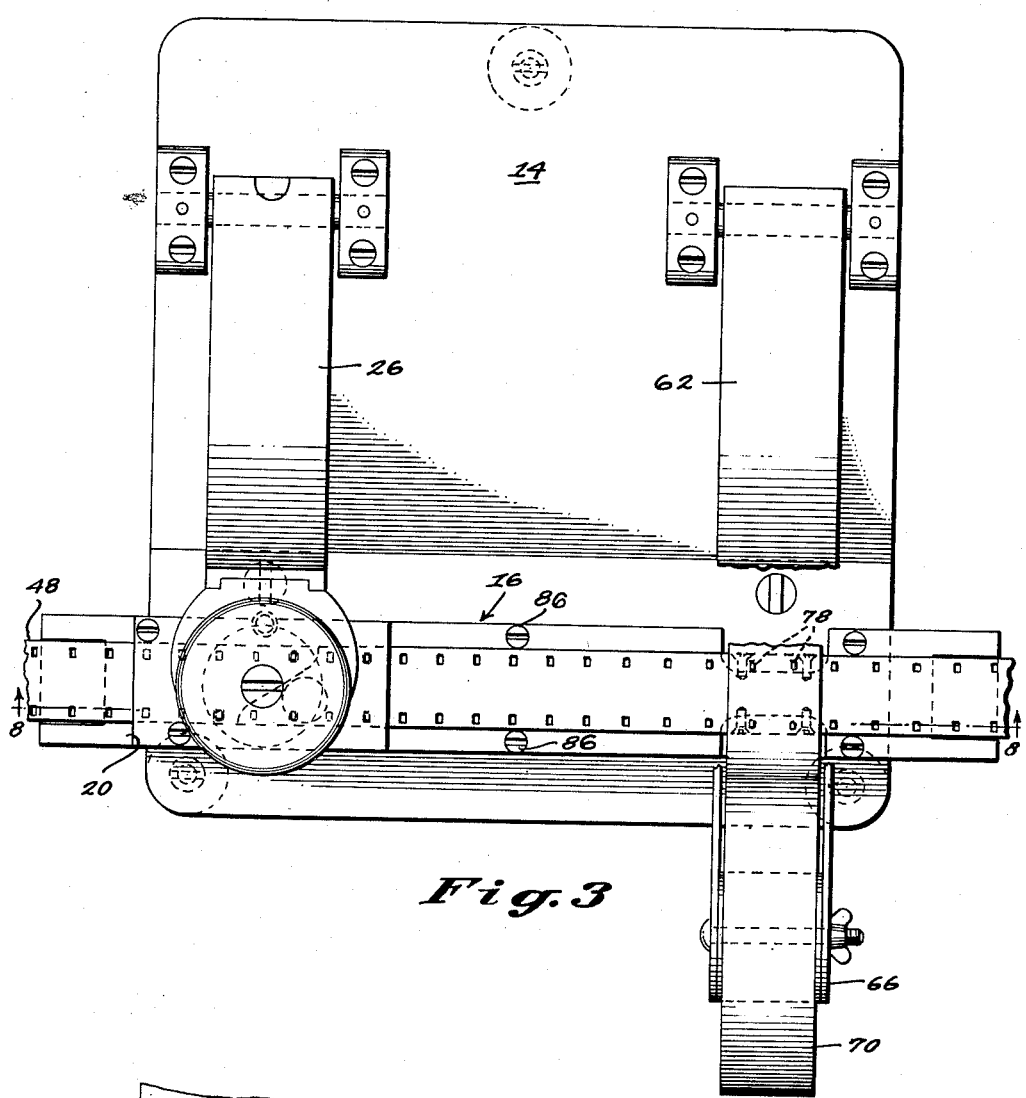
Fig. 3 is a plan view of Fig. 1 with parts broken away.
Figure 4:
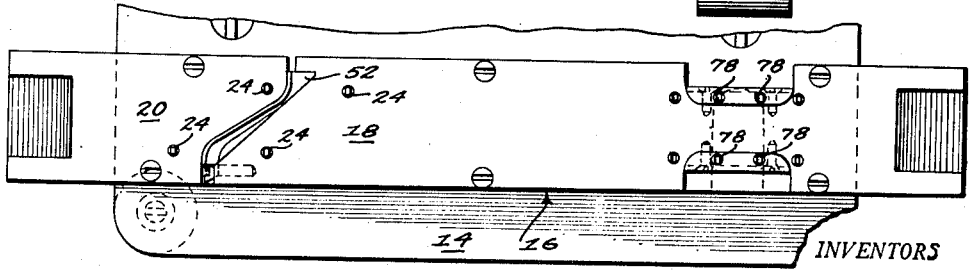
Fig. 4 is a plan view of the film support.

The film support 16 may be fixed to base 14 by means of screws 86 (Fig. 3), and the cut ends of the film can be cut at one location and moved to another for taping and trimming. However, the film support 16 can be provided with a slideway so that the support itself is moved from one position to the other without removing the tape.

Through the use of the device of the present invention, it is now possible to splice a magnetized sound film quickly and accurately, so that no undesirable interference noises are introduced onto the film.

We claim:

1. A film splicer comprising a base, a film slideway across said base, a ledger blade mounted in said slideway diagonally thereof, a depressable member forming a portion of said film slideway adjacent said ledger blade, a shearing arm pivotally mounted on said base adjacent said slideway, a fixed blade carrying member mounted on said arm, a shearing blade mounted therein and adapted to be moved by rotation of said arm to operative position with respect to said ledger blade, said fixed blade carrying member being adapted to displace said depressable member and bring said blades into shearing engagement, register pins on said slideway to position the film to prevent lateral movement during the shearing, a film holding member yieldingly mounted on said arm adjacent said blade carrying member and adapted to engage said film slideway at said ledger blade to hold the film in position during shearing, a tape carrying arm pivotally mounted on said base parallel with said shearing arm, stationary lateral shearing edges on said slideway beneath said tape carrying arm, movable lateral shearing blades mounted on the free end of said tape carrying arm and adapted to cooperate with said mounted lateral shearing edges to trim the tape at the edges of said spliced film, punching dies mounted on said tape carrying arm adjacent and movable with said lateral shearing blades adapted to form register holes in the tape at the splice.

2. A film splicing device comprising a base, film support thereon, register pins on said support for positioning a film to be spliced, a depressable member forming a portion of said film support, a first ledger blade mounted diagonally across said support adjacent said depressable member, a first lever pivotally mounted on said base adjacent said support, a shearing blade carried at the free end of said lever for shearing engagement with said ledger blade, a film clamping member yieldingly carried by said lever in side by side relation with said shearing blade and adapted to engage the film adjacent said ledger blade during shearing of said film, a pair of lateral ledger blades displaced from said first ledger blade opposing edge portions of said film support, a second lever pivotally mounted on said base adjacent said film support, a die member carried by said second lever for reciprocating movement with respect thereto, said die member including a pair of lateral shearing blades for registration with said lateral ledger blades for trimming the edges of a strip of film disposed on said support and a plurality of punches for forming registration holes in said film, and support means on said second lever for carrying and dispensing adhesive tape across said film at said lateral shearing blades to join the severed ends.

3. A device for splicing magnetic sound film comprising a base, a film support of non-magnetic material across said base having a fixed portion and a depressable portion, a plurality of pins projecting upwardly of said support for registration with the holes in a strip of film, a ledger blade extending diagonally across the inner end of the fixed portion of said film support adjacent said depressable portion, a lever mounted on said base for swinging engagement with said film support at said ledger blade, a movable blade supporting member carried at the free end of said lever, a shearing blade mounted thereon, said blade supporting member being adapted to displace said depressable member and bring said shearing blade into operative engagement with said ledger blade, a film holding member carried at the free end of said lever adjacent said blade supporting member for reciprocating movement with respect thereto and for engagement with the fixed portion of said film supporting surface, a pair of lateral edge trimming blades disposed on opposing edge portions of the fixed portion of said film supporting member, a second lever pivotally mounted for swinging movement to said film supporting member at said edge trimming blades, means mounted on the free end of said lever for dispensing adhesive tape to the film on said film support, a die of non-magnetic metal supported thereon for reciprocating movement, said die including at its end a pair of shearing blades for engagement with said lateral blades, and a plurality of punches, said lateral blades and punches being adapted to trim and perforate the tape placed across the abutting edges of said film for forming the splice.

4. A film splicer comprising a base, a non-magnetic film support thereon, said support having a fixed member and an abutting depressable member, said members having their abutting ends diagonally cut, a ledger blade affixed to the inner end of said fixed member diagonally across said support, a lever pivotally mounted for swinging movement to said film support at said ledger blade, a shearing blade mounted on said lever, means for reciprocating said shearing blade to bring it into operative engagement with said ledger blade, means for holding a strip of film in place during shearing, lateral ledger blades secured to edge portions of said film support, a second lever pivotally mounted on said base for swinging to said film support at said lateral ledger blades, lateral shearing blades mounted on said second lever, means for reciprocating said lateral shearing blades to bring them into operative engagement with said lateral ledger blades, means mounted on said second lever for dispensing adhesive tape across said film support, at said lateral ledger blades and means mounted on said second lever for forming register holes in the tape placed on said film.

RALPH M. NICHOLS.
CHARLES D. COWAN.

References Cited in the file of this patent

UNITED STATES PATENTS

| Number | Name | Date |
|---|---|---|
| 1,121,765 | Schultze | Dec. 22, 1914 |
| 2,346,874 | Russell | Apr. 18, 1944 |
| 2,446,576 | De Vry | Aug. 10, 1948 |
| 2,499,686 | Selmin | Mar. 7, 1950 |
| 2,539,611 | Daniel et al. | Jan. 30, 1951 |
| 2,565,009 | Wallingsford | Aug. 21, 1951 |